Oct. 13, 1936.                T. H. LONG                    2,057,495
                          PHOTOSENSITIVE DEVICE
                         Filed Oct. 19, 1932          4 Sheets-Sheet 1
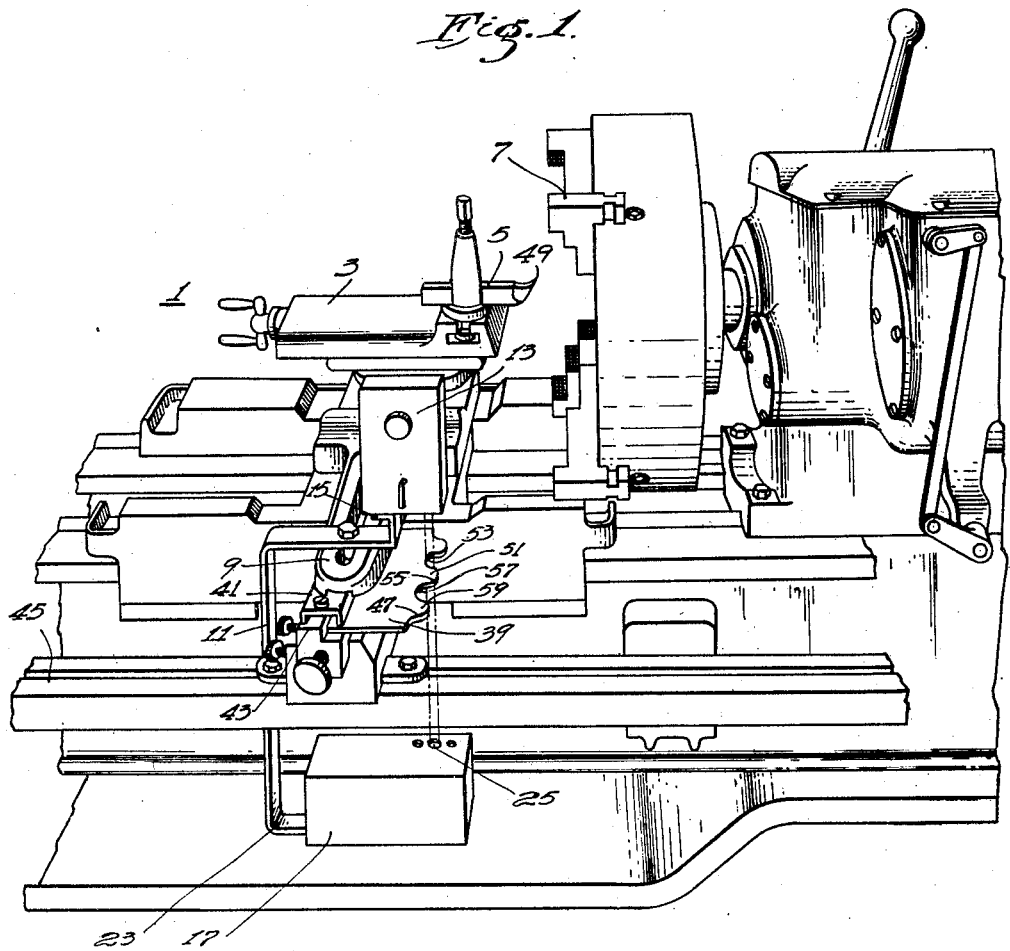

Oct. 13, 1936.  T. H. LONG  2,057,495
PHOTOSENSITIVE DEVICE
Filed Oct. 19, 1932  4 Sheets-Sheet 2
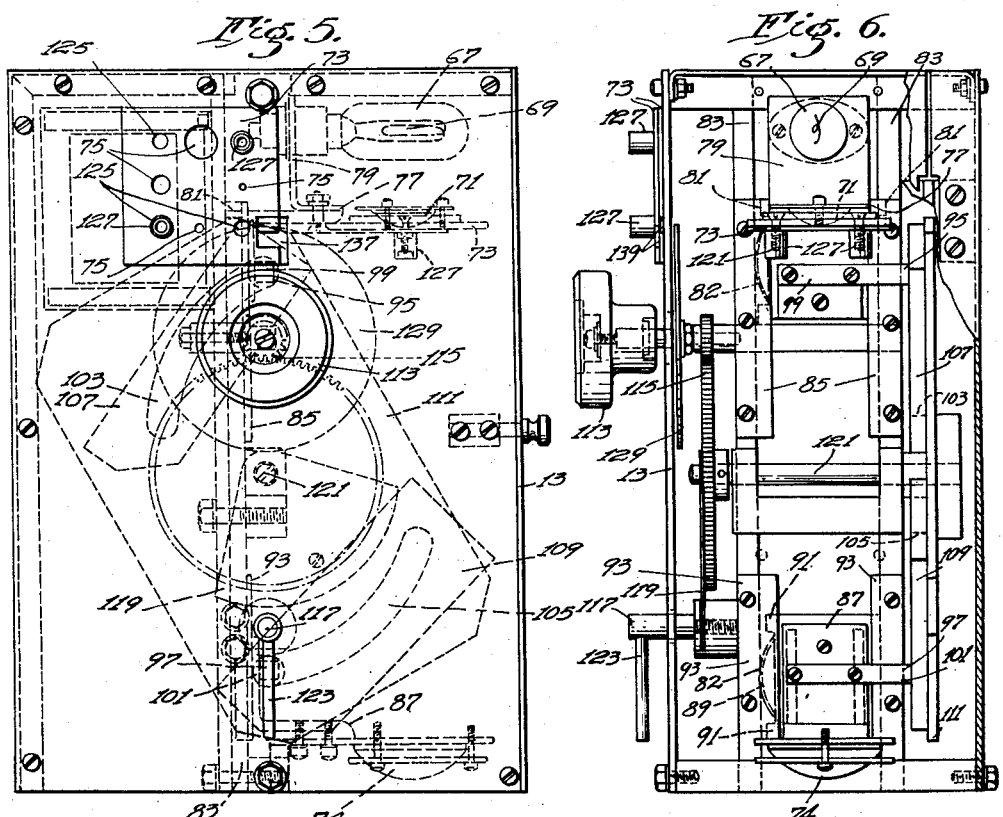
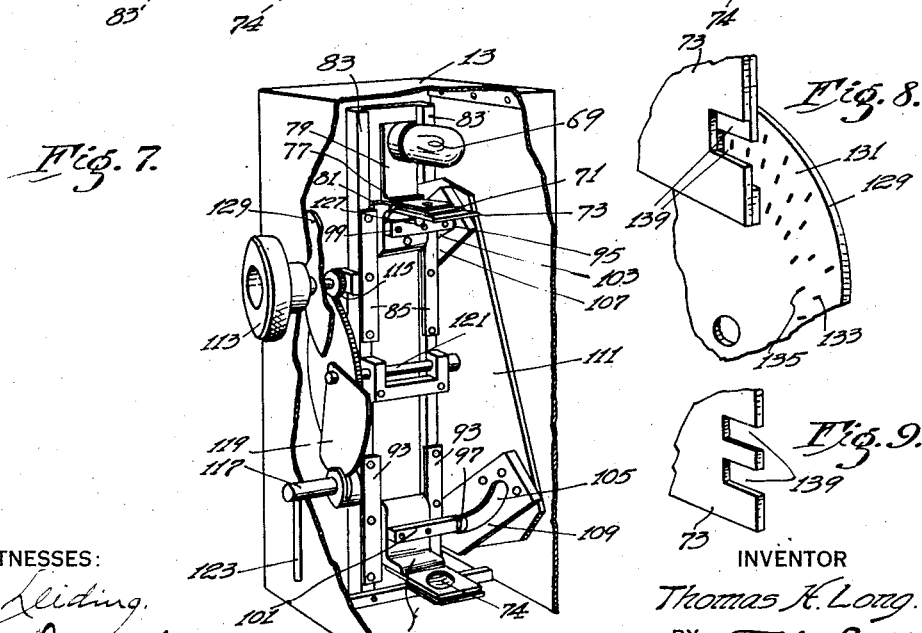
WITNESSES:
INVENTOR
Thomas H. Long.
BY
ATTORNEY Oct. 13, 1936.                T. H. LONG                    2,057,495
                        PHOTOSENSITIVE DEVICE
                        Filed Oct. 19, 1932          4 Sheets-Sheet 3

WITNESSES:                                           INVENTOR
E. C. Gliding,                                    Thomas H. Long.
Hymen Diamond                                     BY F. W. Lyle.
                                                          ATTORNEY Oct. 13, 1936.                    T. H. LONG                    2,057,495
                            PHOTOSENSITIVE DEVICE
                            Filed Oct. 19, 1932            4 Sheets-Sheet 4

WITNESSES:                                              INVENTOR
E. C. Leiding.                                          Thomas H. Long.
Hymen Diamond                                           BY
                                                        F. W. Lyle
                                                            ATTORNEY Patented Oct. 13, 1936

2,057,495

UNITED STATES PATENT OFFICE 2,057,495

PHOTOSENSITIVE DEVICE

Thomas H. Long, Irwin, Pa., assignor to Westinghouse Electric & Manufacturing Company, East Pittsburgh, Pa., a corporation of Pennsylvania Application October 19, 1932, Serial No. 638,579

4 Claims. (Cl. 250—27)

My invention relates to photo-sensitive devices and has particular relation to photo-sensitive control systems for machine tools.

A control system for an automatic machine constructed and operated in accordance with the teachings of the prior art of which I am aware in general includes a support for a work-piece that is to be shaped in a predetermined manner, a support for a tool that is to engage the work-piece to shape it, and a plurality of motors for moving the tool in the directions required for shaping the work-piece. The motor is controlled by the cooperation of a template that is ordinarily shaped in a manner to correspond to the desired configuration of the work-piece and a mechanical pick-up element which is coupled to the control elements of the motor and which mechanically engages the template in such manner that the motor controls are properly operated to move the tool support in the manner desired.

A consideration of the systems provided in accordance with the teachings of the prior art at once discloses a number of disadvantages which are inherent in these systems. Among these, the most important probably involves the difficulty of suitably coupling the motor controls with the template through the mechanical pick-up. By reason of the difficulty encountered in this connection, the control system is comparatively complicated and involves a large number of accurately machined levers and switches that are apt to render the operation of the system uncertain and to decrease its accuracy.

Another matter which is ordinarily encountered in the operation of automatic machines of the prior art involves the sluggishness of operation of the mechanical pick-up and the difficulty of providing a suitable pick-up and so adjusting its coaction with the template that the tool accurately and quickly follows the template in responding to the pick-up.

It is accordingly an object of my invention to provide a control system for an automatic machine in which the cutting tool shall accurately follow the response of the pick-up to the variations in the contours of the template, and by the application of which it shall be possible to shape a work-piece accurately in accordance with desired specifications.

Another object of my invention is to provide a control system for an automatic machine in which the control elements for the motor and the system whereby these elements are coupled to the template shall be of simple and tractable structure.

A further object of my invention is to provide for an automatic machine a control system incorporating a pick-up that shall be inertialess, and that shall be capable of being coupled to the control elements for the motors, whereby the tools are operated, in a simple manner.

A still further object of my invention is to provide for an automatic machine a control system incorporating a pick-up that shall be so tractable as to be capable of adaptation to the operation of tools of widely diverse dimensions.

An incidental object of my invention is to provide an optical system to be utilized in the control system of an automatic machine, that shall be of such character that by a simple adjustment thereof the system shall be adapted to be utilized with tools of any desired dimensions.

Another incidental object of my invention is to provide a photo-sensitive pick-up for the control system of an automatic machine of a type that shall be capable of facile adaptation for tools of different characteristics.

Still another incidental object of my invention is to provide a control system for an automatic machine of the type incorporating a pick-up element and a template cooperating therewith in which the template shall be capable of utilization as a finish gauge for the work shaped in the machine.

A further incidental object of my invention is to provide an optical system for the photo-sensitive control element of an automatic machine of a type wherein, by a single operation of a control knob, the apparatus shall be adapted to operate with a cutting tool of any desired dimensions.

An additional incidental object of my invention is to provide for the adjustable photo-sensitive pick-up of an automatic machine a simple indicating device.

Still another incidental object of my invention is to provide for the adjustable photo-sensitive pick-up of an automatic machine a contrivance whereby the proper indications of the adjustment made by the operator shall be exhibited without any operation on the part of the operator beyond those necessary in the ordinary operation of the machine.

An ancillary object of my invention is to provide a suitable amplifying system for the photosensitive pick-up of the control element of an automatic machine.

A further ancillary object of my invention is to provide an amplifier system of the type incorporating electric-discharge devices of the type having abrupt characteristics in which the difficulties inherent in drift phenomena that commonly arise in utilizing such electric-discharge devices shall be repressed.

More concisely stated, it is an object of my invention to provide a control system for an automatic machine that shall be of comparatively simple structure, that shall be capable of accurately and with facility following templates having a wide variety of configurations and that shall be capable of adaptations to use with cutting tools of a wide variety of different characteristics.

According to my invention, I provide a control system for an automatic machine in which the pick-up element comprises a source of radiant energy that cooperates with an optical system to project a radiant image on the contours of a template and a photo-sensitive device to respond to the resultant radiant energy emitted by the template. To avoid the inaccuracies which might arise when the radiant beam traverses the corners and turns of the template, the radiant image projected on the template is of dimensions substantially equal to the dimensions of the cutting edge of the cutting tool. Since the cutting edge of the tool normally has the contour of a circular arc, the image is also circular and is of a diameter equal to the diameter of the cutting edge of the tool.

The apparatus for producing the radiant beam utilized in the practice of my invention comprises a source of radiant energy, such as an ordinary lamp, an aperture plate which is so disposed as to be illuminated by the source and a projecting lens which is so positioned relative to the aperture plate as to cast an image of the aperture plate on the template. Since it is desirable that the control system be adapted to be utilized with tools having a wide variety of dimensions, the image of the aperture in the aperture plate which is projected on the template is capable of variations in dimensions. The dimensions of the image are varied by an adjustment whereby the imaging lens and the aperture and lamp assembly are moved relative to each other and to the template.

To further widen the field of applicability of the pick-up device, a number of aperture plates having apertures of different dimensions are provided. Each aperture plate comprises a rectangular slab near the four corners of which a plurality of supporting holes are bored. Between these holes four apertures of different dimensions are bored. The lamp is so mounted relative to the support provided for the aperture plate that when the aperture is mounted in any one of the four orientations in which it is capable of being mounted, an aperture corresponding to the particular mounting is illuminated, and is, therefore, imaged on the template.

In the practice of my invention, three aperture plates are generally provided. Each aperture plate is equipped with four apertures which are of diameters that are simple multiples of each other. In practice I prefer that the diameters of the larger apertures of any one plate should be respectively two, four and eight times the diameter of the smallest aperture. The apertures of the different plates are so related to each other that the total range of tool dimensions is subdivided into a series of overlapping regions, each region corresponding to the image dimensions that can be obtained with a single aperture by varying the optical system over its whole range. Specifically, the ratio of the diameters of corresponding holes of two plates is as the $n$'th root of $v$ is to 1 where $n$ is the number of plates and $v$ is the ratio of successive aperture diameters in any one plate. Thus in the present case the ratio is $3\sqrt{2:1}$.

The contrivance whereby the dimensions of the image projected on the template are varied comprises a hand knob which is coupled to the supports for the imaging lens and lamp and aperture, in such manner that by simple rotation thereof these elements are moved relative to each other. A circular plate having a plurality of dial indications thereon is mounted concentric with the knob and rotates therewith. The dial scales are three in number, each corresponding to the largest aperture of an aperture plate. Given the indication for any particular setting of the knob, the dimensions of the corresponding image may therefore be calculated from a knowledge of the particular aperture of an aperture plate that is utilized.

The aperture plates are equipped with grooves which are so disposed that when two of the aperture plates are mounted in position they cover the scales which correspond to them, leaving open to view the scale which corresponds to the aperture plate mounted in operative position.

The radiations projected across the contour of the template impinge on the sensitive element of a photo-sensitive device. A toothed disc is rotated in the path of the beam and as it rotates it produces a predetermined number of interruptions in the beam. The interruptions thus produced result in pulsations in the output of the photo-sensitive device subjected to the beam and render the output of the photo-sensitive device capable of amplification by an amplifier of the alternating-current type. The output of the amplifier is impressed between the control electrodes and the principal electrodes of a plurality of gas-filled electric-discharge devices of the grid-controlled type, in such manner as to energize the devices in accordance with the magnitude of the output.

The electric-discharge devices are so connected as to excite the relays whereby the clutches, for coupling the driving motors to the proper gears to motivate the tool support in the desired directions, are rendered operative. The system involving the clutches does not concern the present invention, and for this reason, is not described herein. However, it is shown and described in a copending application, Serial No. 659,120, filed March 1, 1933, to O. G. Rutemiller and myself.

The apparatus whereby the radiant beam is produced and the photo-sensitive device are so mounted as to move with the tool support, while the templet is fixed. When the optical elements are so positioned relative to the template that the template completely obstructs the beam the electric discharge devices are deenergized and the particular clutch in operative relation with the motor produces a motion of the tool support such that the tool moves normally towards the work-piece. After the optical elements have been displaced a distance dependent on the character of the template and a predetermined minimum amount of radiant energy projects over the edge of the template, one set of electric-discharge devices is energized, and a relay is excited to operate a system of clutches whereby any previous motion is interrupted and a traversing motion is initiated. The traversing motion continues until the radiant beam is again obstructed, or the flux impinging on the photosensitive device is moved to a predetermined value, in which case the traversing motion is interrupted and inward or outward motion depending on the condition of excitation of the photo-sensitive device is initiated.

The outward motion is produced when the excitation of the photo-sensitive device is increased to the predetermined value greater than the value for which the traverse motion takes place. In such a case a second set of electric-discharge devices become energized. When this set of electric-discharge devices becomes energized a system of relays is energized to operate the necessary clutches to interrupt the traverse motion and initiate the outward feeding motion.

A third set of electric-discharge devices is provided for the purpose of stopping the entire system when an excess of light impinges on the photo-sensitive device. Such a situation occurs, for example, when the template has by some inadvertence been removed from its proper position, in which case, it is desirable that the tool and the machine should be stopped.

It will be noted that the gas-filled electric-discharge devices utilized in the practice of my invention are connected in pairs. This arrangement is essential by reason of the fact that gas-filled devices of the grid-controlled type have what has been designated as a drift characteristic. It has been found that after a gas-filled electric-discharge device has been utilized for some time its properties change in such manner that its potential-response characteristic is varied, that is to say, a gas-filled electric-discharge device at a particular time becomes energized for a certain circuiting distribution of potential between its electrodes. After it has been utilized for a comparatively long period of time, its response characteristic is varied and it becomes energized for another limiting distribution of potential between the electrodes which may be and generally is considerably different from the first distribution.

If a single electric-discharge device were utilized for each actuation of the clutches in the practice of my invention, the drift characteristic might occasion considerable difficulty in view of the fact that when the electric-discharge device changes in any manner, its response to the excitation of the photo-sensitive device might change, and for this reason, the system might respond to the excitation of the photo-sensitive device in a manner contrary to expectation. Thus the inward motion of the tool might be initiated when the traverse motion should continue or the traverse motion might be initiated when the outward motion should continue. To eliminate this difficulty, the system utilized in the practice of my invention is provided with pairs of electric-discharge devices. One device is utilized only for the purpose of initially responding to the condition of the electric-discharge device, and is immediately thereafter deenergized. However, before it is deenergized, it causes the second device to become energized and to produce the necessary excitation of the controlling relays. The range of variation of potential which is impressed by the excitation of the first electric-discharge device on the electrodes of the second electric-discharge device is of sufficient magnitude to produce the necessary changes in the second electric discharge device, regardless of the drift characteristic.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a view in perspective showing the essential elements of a control system for a machine constructed in accordance with my invention;

Figs. 2, 3 and 4 are diagrammatic views showing the relationship between the dimensions of the image projected on the template and the dimensions of the cutting tool;

Fig. 5 is a view in front elevation showing an optical system constructed in accordance with my invention;

Fig. 6 is a view in side elevation of the optical system shown in Fig. 5;

Fig. 7 is a view in perspective showing the essential elements of the optical system shown in Fig. 5;

Fig. 8 is a detail view in perspective showing the essential elements of the indicator utilized in the practice of my invention;

Fig. 9 is a view in perspective showing a portion of an aperture plate utilized in the practice of my invention;

Figures 10, 11:
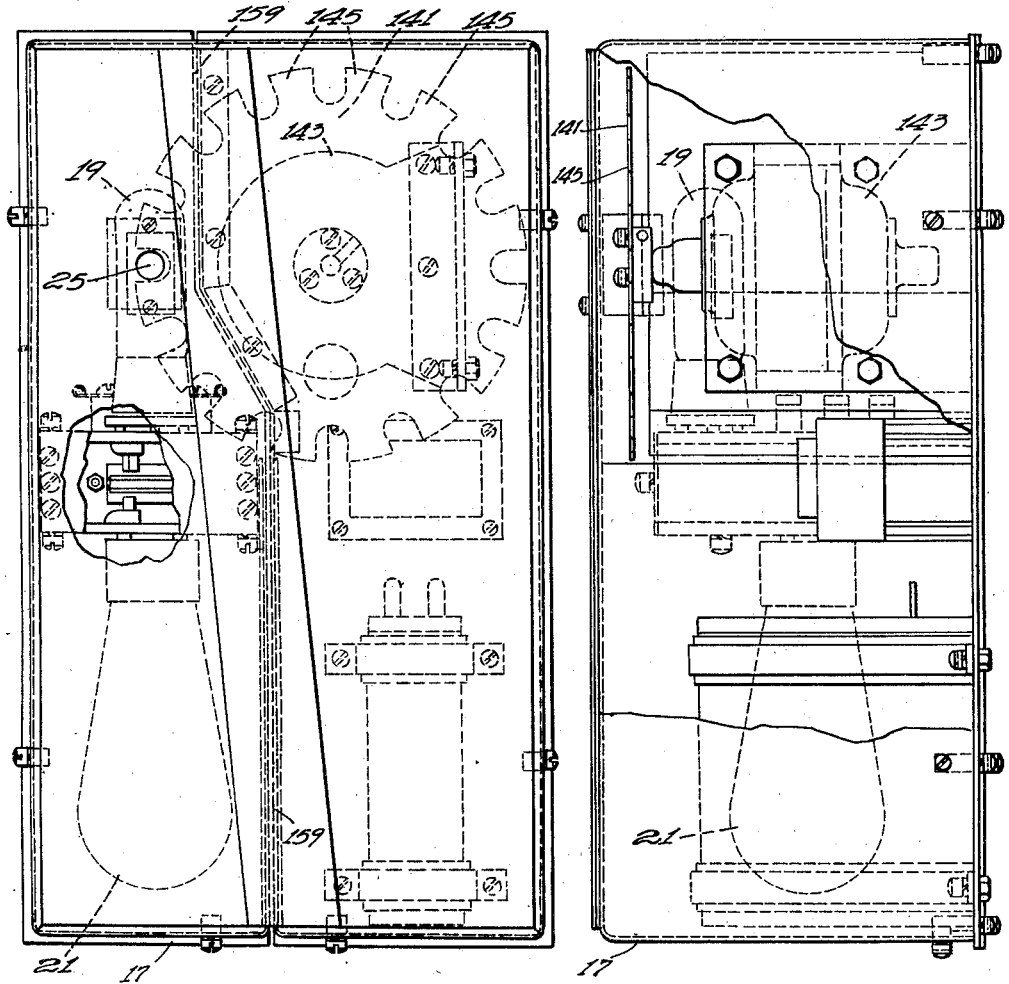
Fig. 10 is a view in front elevation showing a photo-sensitive system constructed in accordance with my invention.
Fig. 11 is a view in side elevation of the photo-sensitive assembly shown in Fig. 10.

The apparatus shown in Fig. 1 comprises a lathe 1 incorporating the usual elements, to-wit, a support 3 for a cutting tool 5 and a support 7 for a work-piece (not shown), to be shaped in a predetermined manner. The cutting-tool support 3 is equipped with the ordinary adjustments and is motivated by a motor (not shown), through a system of clutches and gears in a manner depending on the disposition and the desired structure of the piece to be shaped. The motor and its coupling do not concern the present invention and are for this reason not shown.

The cutting-tool support 3 is equipped with a slotted extension 9 in which a bracket 11 is adjustably secured. A container 13 having disposed therein the elements of the optical system, which will be described in detail hereinafter, is secured to an upper flange 15 of the bracket 11 while a container 17, in which a photo-sensitive device 19 and certain amplifying elements 21 also to be described in detail hereinafter are disposed, is secured on a lower flange 23 of the bracket 11. A beam of radiant energy is projected through an opening in the container 13 of the optical system and passes through an opening 25 in the container 23 of the photo-sensitive system, thereby energizing the photo-sensitive device 19.

The output of the photo-sensitive device 19 is suitably amplified by a system of high vacuum and gas-filled electric-discharge devices, and the output of the amplifier is fed into the exciting coils 27, 29 and 31 of a series of electromagnetic relays 33, 35 and 37 to actuate the necessary clutches and thereby to produce the necessary motion of the tool support 3.

The manner in which the clutches are to be coupled to the motor whereby the tool support is to be motivated is dependent on the particular machine utilized and should be apparent to one skilled in the art and desiring to apply my invention to a particular machine. To discuss the manner in which the machine is operated from the clutches would, therefore, be superfluous in the present state of the art, and would render the specification unnecessarily verbose.

It is to be noted that since the containers 13 and 17 for the optical system and for the photo-sensitive system are both secured to the tool support 3, they are therefore movable therewith and follow the motion of the tool 5.

A template 39 of structure corresponding to the shape of the work-piece that is desired is secured to a clamp 41 suitably mounted in a vise 43 which in turn is slidably supported in a track 45 secured to the lathe 1 and is thus capable of proper positioning in the lathe. When properly positioned the template 39 is so oriented that its edge 47 that is so cut as to correspond to the desired final configuration of the work-piece, intercepts or partially intercepts the beam of radiations projected from the container 13 for the optical system. The movement of the tool support 3 and, therefore, of the tool 5, is predetermined by the extent to which the beam of light is intercepted by the edge 47 of the template 39. The beam of light is movable relative to the template 39 and it is, therefore, capable of tracing out in space a cylinder corresponding to the edge 47 of the template 39. The interaction between the beam, the photo-sensitive system and the template 39 is such that substantially such a cylinder is traced. At the same time the cutting edge 49 of the tool 5 which moves with the beam of radiations traces a curve corresponding to the configuration of the guiding edge 47 of the template 39 and when in engagement with the work-piece shapes the latter to correspond to this configuration.

The template 39 is of such structure that projecting portions of its controlling edge 47 correspond to the indentations to be milled on the work-piece and the indentations of its controlling edge correspond to the projections in the final work-piece. This procedure is followed to provide for the accurate correspondence of the movement of the cutting-tool 5 with the movement of the light beam. For proper operation of the system the light beam should cut the same configuration in space as the cutting-tool 5 cuts out in the work-piece. It is to be noted that the template is of such structure that it may be utilized as a finish gauge for the work-piece.

In accordance with the practice of my invention, the movement of the light beam and its attached elements is dependent on the state of excitation of the photo-sensitive device 19 and the circuit associated with the photo-sensitive device 19 is so adjusted that the cutting-tool 5 is moved in an inward direction when the beam of light is totally obstructed and is moved in an outward direction when the total radiant flux impinging on the photo-sensitive device 19 is greater than a predetermined value. On the other hand, when a predetermined minimum radiant flux is less than the predetermined value projected on the photo-sensitive device 19, the tool 5 is moved neither in nor out but in a direction transverse to the work-piece.

The operation of the system can probably best be explained with reference to the central projection 51 of the template 39 shown in Fig. 1. Assume for example that the beam of light is totally obstructed near the inside terminal 53 of the central projection 51, and that when moving transverse to the work-piece it moves in a direction away from the plane of the drawing. The tool 5 will then move in an inward direction and the beam of radiant energy will be gradually displaced relative to the template 39 in such manner that a small amount of radiant energy is ultimately projected over the edge 47 of the template onto the photo-sensitive device 19. As soon as the necessary minimum flux impinges on the photo-sensitive device 19, the photo-sensitive system is so actuated that the inward motion is arrested, while the transverse motion is initiated. As the tool 5 is therefore moved in a transverse direction, the beam of light is again obstructed completely, the necessary relays of the photo-sensitive system are again actuated and the transverse motion is stopped, while the inward motion is again initiated. The same process is repeated until the tool 5 attains such a position that the beam of light is obstructed by the region of the stationary point 55 of the central projection 51 of the template 39.

At this point, the inward motion is again stopped and the transverse motion is again initiated. However, by reason of the fact that the side of the projection towards which the beam of light is now moved slopes in a direction opposite to the direction in which the other side slopes, the flux impinging on the photo-sensitive device 19 is increased by the transverse motion of the tool 5 rather than decreased. For this reason, the flux impinging on the photo-sensitive device 19 soon attains a value for which the transverse motion is stopped and outward motion is initiated. By reason of the outward movement of the beam of light relative to the template 37, the total flux projected on the photo-sensitive device is now decreased until the minimum value is attained for which the outward motion is arrested and the transverse motion is again initiated. This process is repeated until the beam of light is obstructed by the region adjacent the outer stationary point 47 of the projection 51. At this point the beam of radiant energy begins to climb up on the successive projection 59 of the template 39 and the tool begins to move correspondingly.

It will be noted that in operation the radiant beam of the pick-up element moves along the edge of the template 37 in small steps, corresponding to the motion of the tool. That is to say, the path of the pick-up element is made up of a series of short straight lines, each straight line at right angles to the successive straight line and the whole series of straight lines tracing out a curve corresponding to the edge of the template.

The image 61 that is projected on the template 39 by the light beam is substantially identical in form to the configuration of the cutting edge 49 of the cutting tool 5. In general, the cutting edge 49 is of circular form and the image is correspondingly of circular form, the diameter of the beam being substantially equal to the diameter of the cutting edge 49 of the tool 5. This condition is necessary to eliminate difficulties which might otherwise arise in cutting corners.

In Figs. 2, 3 and 4, the difficulties which arise in cutting a turn or a corner in the work-piece are illustrated diagrammatically. In Fig. 2, a portion of the guiding edge 47 of the template 39 is shown and an image 63 of a light source having a diameter smaller than the diameter of the cutting edge 49 of the cutting-tool 5 is shown as impinging on the edge 47 in two successive regions. As the light beam moves relative to the template 39, the image moves out along the curve 47.

In Fig. 3 a corresponding portion of the workpiece 65 is shown in its desired configuration and two positions which the tool 5 assumes relative thereto are shown. The positions correspond to the positions of the image 63. It will be noted that the image 63 and the tool 5 are shown in Figs. 2 and 3 as having moved from a rectilinear portion of the template and work pin adjacent to a curved portion, to the curved portion. In the first of these positions the template 39 obstructs the beam while in the second of these positions, the beam projects over the edge 47 of the template since the direction of motion of the tool is not altered until sufficient radiant energy is projected over the edge 47 of the template 39 to suitably energize the photo-sensitive device. The tools project over the desired edge of the work-piece 65 in its displaced position. If, therefore, the image 63 is of smaller diameter than the cutting edge 49 of the tool 5, the contour which the tool will follow, will correspond to the envelope of a series of tool positions represented by the tool shown in Fig. 3 and, will not correspond accurately to the configuration of the template 39. A corresponding discrepency occurs if the image 63 is of larger diameter than the cutting edge 49 of the tool 5.

In Fig. 4, a section of the template 39 is shown as it appears when intersected by an image, the diameter of which is equal to the diameter of the cutting edge 49 of the tool 5. As will be noted in comparing this view with Fig. 3, the movement of the tool is controlled by the periphery of the image and when the periphery of the image projects over the template 39 by a predetermined amount, the direction of motion of the cutting tool is properly adjusted. Thus, before the cutting tool can be projected to such an extent as to materially vary the configuration of the work-piece from that desired, its direction of motion is changed by reason of the fact that sufficient light is projected over the edge 47 of the template 39 to properly energize the photo-sensitive system. The cutting tool 5, therefore, accurately follows the contour of the template 39 and the final configuration of the work-piece accurately corresponds to the contour of the determining edge 47 of the template.

The cutting tools utilized in the practice of my invention are not of the same diameter and as a matter of fact, vary widely in diameter. I have, therefore, been confronted with the problem of providing an optical system for so varying the diameter of the cross section of the light beam that my invention can be practiced with cutting tools of widely diverse dimensions.

The optical system provided in accordance with this feature of my invention is shown in detail in Figs. 5 to 9, inclusive. As can be seen from these views, it comprises essentially a light source 67 preferably an incandescent lamp, with a small filament 69, a condensing lens 71, and aperture plate 73 of suitable character and a projection lens 74 whereby the image of an illuminated aperture 75 in the aperture plate is projected on the template 39. The condensing lens 71 and the aperture plate 73 are secured to a bracket 77 and the source 67 is supported on a projection 79 of the bracket 77. The bracket 77 is, in turn, equipped with ears 81 that are engaged by the terminals of a bow spring 82 the face of which engages one rail of a track 83. The bracket 77 is thus held in slidable engagement with the track 83. The bracket 77 is moreover maintained on the track 83 by a plurality of plates 85 which are secured to the track 83 and project over the sides thereof to engage the projecting ears 81 of the bracket 77. It is seen that, as the bracket 77 is moved along the track 83, the position of the assembly comprising the source 67 the condensing lens 71 and aperture 75 is changed.

The projection-lens assembly is mounted on a bracket 87 similar to the bracket 77 on which the lamp assembly is mounted. The bracket 87 is also maintained in engagement with the track by a bow spring 89, the terminals of which engage a plurality of cams 91 extending from the bracket and the side of which engages one rail of the track 83. It is moreover held on the track by a plurality of plates 93 that are secured to the track 85 and engage the ears 91 projecting laterally from it.

The lamp assembly and the imaging lens assembly are moved relative to each other and relative to the template 39 by the engagement of the projecting ends 95 and 97 of a plurality of rods 99 and 101 secured to the brackets 77 and 87, with a plurality of cooperating cams 103 and 105 of suitable structure. Each of the cams 103 and 105 is milled in a block 107 and 109 and the blocks are mounted on a plate 111 which may be rotated manually from a knob 113 through a system of gears 115. As the plate 111 is rotated, the position of the pins or cam followers 99 and 101, in engagement with the cams 103 and 105 is changed and the position of the supporting brackets 77 and 87 for the lamp assembly and for the lens assembly are correspondingly changed. It is to be noted that as the positions of the aperture plate 73 and of the projecting lens 74 are changed relative to the template 39, the dimensions of the image projected on the template are changed and the system is thereby adapted to be utilized with cutting tools 5 of different dimensions.

The cam plate 111 may be locked in any one of a plurality of positions by the engagement of a slotted stud member 117 which screws into the track 83, with a disc sector 119 which is mounted on the shaft 121 of the cam plate 111. The locking stud 117 is equipped with a suitable handle 123 which renders it capable of being easily manipulated.

The aperture plates 73 are substantially rectangular and each plate is equipped with four holes 125 so milled that the lines drawn through their centers would form a square on the corners of which the centers are disposed. The holes are normally traversed by a plurality of studs 127 whereby the plates 73 are supported. Apertures 75 of different diameters are drilled substantially midway between the supporting holes 125 and as will be apparent, the particular aperture 75 that is utilized at any particular time is dependent on the orientation of the aperture plate 73 in the supporting bracket 77.

In the practice of my invention, I have preferred to maintain the apertures 75 of diameters, that are multiplied by two of each other, the smallest aperture 75 having a diameter that is ⅛ of the diameter of the largest aperture on any particular plate 73. It is seen that by utilizing a single plate 73 in its various possible orientations and in addition by applying the adjustments provided in the system, the system is adapted to be utilized with a wide variety of cutting tools 5. However, in the practice of my invention, I have found it necessary to utilize three aperture plates rather than a single plate. Two of these plates are ordinarily supported in a storing position as shall be described hereinafter while one plate is supported in operative position.

It is essential that the optical system be provided with a calibrated scale for indicating the diameter of the aperture image corresponding to the various positions of the adjusting knob 113, and the provision of such a scale for the numerous apertures raised a considerable problem. The scale constructed in accordance with my invention comprises a plate 129 having series of dials 131, 133 and 135 ruled thereon. The plate 129 is mounted concentrically with the knob 113 whereby the cam plate 111 is rotated.

Each dial, 131, 133 and 135 is calibrated to read the dimensions of the image of the largest aperture 75 of a single aperture plate 73. The image dimension which corresponds to a particular setting of a dial when the aperture plate 73 is so oriented that any other aperture when the smallest one is being projected on the template 39 may be obtained simply by dividing the reading of dial by 2, 4 or 8 depending on the particular aperture utilized.

The indicating disk 129 may be observed through an opening 137 in the container 13 of the optical system and the particular dial 131, 133 or 135 corresponding to the plate 73 which is in operative position is visible through the opening while the other dials are covered by the sides of the aperture plates 73 which are not being utilized and which are, therefore, supported in storing position adjacent to the dial disk 129.

To provide for the exposure to view of the proper dial, the aperture plates 73 are equipped with slots 139. The slots 139 in one plate are so positioned that the two upper dials 131 and 133 are visible through the plate 73 when the plate is mounted in storing position; the slots 139 in the second plates 73 are so positioned that the lower two scales 133 and 135 are visible through the plate when it is mounted in storing position and the slots 139 in the third plate 73 are so positioned that the upper and lower scales 131 and 135 are visible through it while the central scale is covered when it is mounted in storing position. When two of the plates 73 are superposed upon each other in storing position, only one of the dials 131, 133 or 135 remains visible through the superposed plates and this dial corresponds to the particular aperture plate 73 that is mounted in operative position. It is seen that to accomplish this object, the upper scale 131 must be made to correspond to the plate 73 in which the slot 139 is so milled that the upper scale is covered; the central scale 133 must correspond to the plate 73 in which the slots 139 are so cut as to leave exposed to view the upper and lower scales 131 and 135 and the lower scale 135 corresponds to the plate 73 in which the slots 139 are so cut as to leave exposed to view the upper and central scales 131 and 133.

The utilization of the optical system is apparent from the above description. The particular plate 73 to be utilized is mounted in the position provided therefor on the bracket 77 while the other plates 73 are mounted in storing position. The hand knob 113 is then turned until the proper scale indicates the diameter of the cutting edge 49 of the tool that is to be utilized and the system is then locked in position. In its locked position, the optical system is thus adapted to be utilized with the tool for which it was thus adjusted.

The photo-sensitive unit is shown in detail in Figs. 10 and 11. As shown in these views, the unit comprises in addition to the photo-sensitive device 19, a light chopper 141 that is rotated from a motor 143 of suitable character and is so mounted within the casing 17 that its teeth 145 interrupt the light which is projected through the opening 25 on the cathode 147 of the photo-sensitive device 19. The light thus interrupted excites the photo-sensitive device 19 and the output of the photo-sensitive device is amplified by a plurality of high vacuum amplifiers 21, 151, 153 and 155; the first one 21, of which is mounted contiguous to the photo-sensitive device 19 to eliminate any difficulties which might otherwise arise from capacity losses inherent in long leads extending from the photo-sensitive device to the amplifier 21. Suitable partitions 159 are provided in the container 17 to isolate the photo-sensitive device 19 from the amplifier 21 and from the other elements of the system.

Figure 12:
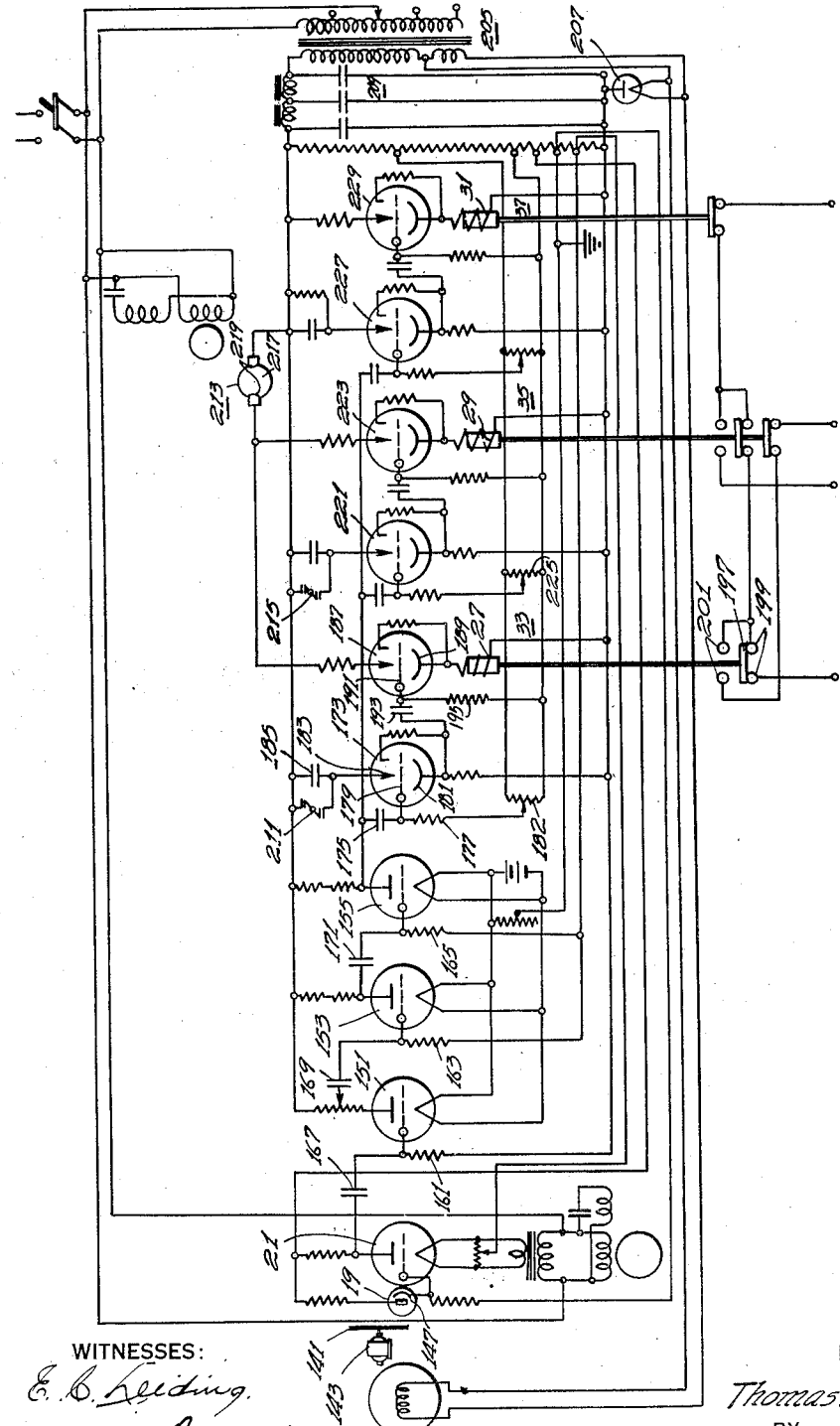
Fig. 12 is a diagrammatic view showing the circuit of the photo-sensitive device and its associated amplifying elements that is utilized in the practice of my invention.

The complete amplifier that is preferably utilized in the practice of my invention is shown in detail in Fig. 12 and includes in addition to the high vacuum amplifiers 21, 151, 153 and 155, the resistors 161, 163 and 165 and the capacitors 167, 169 and 171 whereby the amplifiers are coupled to each other. The last amplifier 155 is coupled to a gas filled electric discharge device 173 preferably of the grid glow type through a capacitor 175 and a resistor 177 and its output potential is impressed between the control electrode 179 and the cathode 181 of the device 173. When the flux impinging on the photo-sensitive device 19 attains a value which is determined by the setting of a potentiometer 182 coupled to the control electrode 179 of the gas-filled device 173, the device becomes energized and current is transmitted between the cathode 181 and the anode 183 thereof.

However, a capacitor 185 of suitable magnitude to correspond to the output of gas-filled device 173 is connected in series with its principal electrodes 181 and 183 and as current is transmitted through the device, the capacitor 185 is charged and eventually a potential of such polarity as to oppose the current between the principal electrodes 181 and 183 of the device 173 is impressed on its plates and the device becomes deenergized. Before this condition occurs, a second gas-filled electric discharge device 187 is energized by reason of the change in potential impressed between its cathode 189 and its control electrode 191 by the current flow through the first electric discharge device 173.

The second gas-filled device 187 is coupled to the first device 173 through a capacitor 193 of suitable magnitude and through a resistor 195 and these elements are so adjusted that, regardless of variations introduced in the characteristics of the second device 187 by aging, the excitation of the first device 173 produces sufficient change in potential to energize the second device.

The principal circuit of the second electric discharge device 187 is connected through the exciting coil 27 of the relay 33 and when this device becomes energized the relay 33 becomes excited and its movable contactor 197 is disengaged from a plurality of corresponding fixed contacts 199 and engages another set of fixed contacts 201. By the disengagement of the movable contactor 197 from the first set of fixed contacts 199, the clutch (not shown) wherby the inward or outward feed of the motor was maintained is rendered inoperative and by the engagement of the movable contactor 197 with a second set of fixed contacts 201, the traverse feed is initiated.

It is seen that the system involving the gas-filled electric discharge devices 173 and 187 is so adjusted that the first device 173 does not carry current for any appreciable length of time and has therefore, generally a characteristic which may be depended upon to remain unchanged. The second device 187 on the other hand, while it must of necessity remain energized for considerable periods of time, is not dependent upon its excitation for small changes in the potentials impressed on the control circuit thereof but depends for its excitation simply on the potentials impressed by the comparatively large change which occurs when the first electric discharge device 173 passes from a deenergized condition to an energized condition. The difficulties with aging which I have observed and which I have encountered in utilizing gas-filled electric-discharge devices are thus avoided and the frequent replacements or changes in the circuit which would otherwise be necessary are obviated.

The system is supplied with power from a transformer 205 through a rectifier 207 and a system of filters 209. It is a well known fact that a gas-filled electric-discharge device when once energized by a variation of the potential applied to its control circuit remains in its energized condition regardless of the changes introduced in the potential of the control circuit until the potential between the principal electrodes is reduced to a value smaller than the value of the cathode drop of potential required to maintain the device in energized condition. Since the system in the present case is operated by direct current power supply, it is essential that some external means be provided for maintaining the gas-filled electric-discharge device in a condition continuously responsive to the variation in potential applied to the control electrodes thereof.

For this purpose, interrupters 211, 213 and 215 are provided. One interrupter 211 is coupled across the capacitor 185 whereby the first electric-discharge device 173 is deenergized and it short circuits the capacitor 185 at a rate which is large compared to the rate at which changes occur in the radiant flux projected on the photo-sensitive device 19 by reason of the cooperation of the light beam and the template 39. It is seen that the interrupter 211 continues to maintain the capacitor in discharged condition and the electro-discharge device 173 associated with the capacitor 185 is maintained in a condition such that its control circuit is always responsive to the state of excitation of the photo-sensitive device 19.

The potential applied to the principal circuit of the second electric-discharge device 187 is periodically reduced by an interrupter 213 comprising a rotating disk 217 equipped with insulating inserts 219. The disk 217 is rotated at such a rate that the circuit is broken by the inserts at a frequency that is great compared to the rate at which the flux impinging on the photo-sensitive device 19 is changed by the template 39. This circuit is, therefore, also maintained continuously responsive to the condition of the photo-sensitive device 19.

It is seen that by the action of the interrupter 211 the first electric-discharge device 173 will be energized and deenergized continuously as long as the flux impinging on the photo-sensitive device 19 is equivalent to the necessary predetermined value. On the other hand, the changes occurring in this device will also maintain the second device 187 energized as long as the proper condition of excitation exists in the photo-sensitive device. The relay 33 associated with the second electric-discharge device 187 is of such character that it does not become deenergized when the electric-discharge device is for an instant deenergized by the rotation of the switch 213. On the other hand, if after the switch 213 has broken the principal circuit of the second electric-discharge device 187, the first electric discharge device 173 does not become energized for a considerable period of time, the second device 187 will also remain deenergized and the relay 33 associated therewith will be deenergized.

When the flux of the radiations impinging on the photo-sensitive device 19 becomes greater by a predetermined amount than the minimum value for which the first set of electric-discharge devices 173 and 187 become energized, the electric-discharge devices 221 and 223 of a second set become energized. The flux for which the devices 221 and 223 become energized is regulated by the setting of a second potentiometer 225 associated with the first device 221 of this set that is similar to the corresponding potentiometer 182 which is associated with the first device 173 of the set which has been described hereinabove. The operation of the devices 221 and 223 is similar to the operation of the other set. When the second device 223 of the set becomes energized, the relay 35 is excited and the necessary clutch for producing the inward movement of the tool 5 is rendered operative, while the clutch for producing the traverse motion of the tool 5 is rendered inoperative.

A third set of devices 227 and 229 similiar to the first two sets are provided for the purpose of stopping the machine when the excitation of the photo-sensitive device 19 is greater by a predetermined amount than the excitation necessary for energizing the second set of electric-discharge devices 221 and 223. The third set of devices is provided for the purpose of stopping the machine in contingencies or when the tool support is in such a position that the beam of light has just passed over a terminal of the determining edge 47 of the template 39. The exciting coil 31 of the relay 37 whereby all the circuits are opened is connected in the principal circuit of the second electric-discharge device 229 of this set.

The explanation of the operation of the relay system shown in Fig. 12, has been given in detail hereinabove. When the template 39 and optical system are so disposed relative to each other that the photo-sensitive device 19 is substantially deenergized, the controlling relays are in the positions shown in the view and the tool 5 is being fed in an inward direction. When the flux impinging on the photo-sensitive device 19 is of such magnitude that the first set of electric-discharge devices 173 and 187 are energized, the corresponding relay 33 is energized and the inward feeding of the tool 5 is arrested while the traverse feed is initiated. On the other hand, when the light flux impinging on the photo-sensitive device 19 is such that both the first and second set of gas-filled electric-discharge devices are energized, the corresponding relays 33 and 35 are in excited condition and the traverse feed is interrupted while the outfeed is initiated. Correspondingly, when the flux impinging on the photo-sensitive device 19 is such that the third set of electric-discharge devices 227 and 229 are energized, the movement of the tool 5 is entirely interrupted.

Although I have shown and described certain specific embodiments of my invention, I am fully aware that many modifications thereof are possible. My invention therefore, is not to be restricted, except insofar as is necessitated by the prior art and by the spirit of the appended claims.

I claim as my invention:

1. Translating apparatus comprising an electric-discharge device having a plurality of electrodes said device being of the type that has an energized condition and a deenergized condition and is capable only of abrupt transition from one condition to the other as the potentials impressed between its electrodes is varied, a network through which said discharge device is to pass current for an appreciable length of time whereby said device exhibits a drifting characteristic that is evidenced by a variation in the distribution of potential between its electrodes for which it changes its condition at different times, means for impressing potentials between the electrodes of said electric-discharge device that are of such magnitude as to maintain said device in one of said conditions regardless of said drifting characteristic, means for changing the condition of said device, said means including: a second electric-discharge device having a plurality of electrodes, said device being of the type that is capable of abrupt transition from one condition to the other, means for impressing potentials between the electrodes of said last-named electric-discharge device to maintain said device deenergized thereby to maintain said first-named device in one of its conditions and means for so coupling said last-named electric-discharge device to said first-named electric-discharge device that when said last-named device is energized the change in potential produced between the electrodes of said first-named device is sufficient to at all times immediately change the condition of said first-named device regardless of the drifting characteristic of said first-named device, means for varying the potentials impressed between the electrodes of said last-named electric discharge device to energize said last-named device thereby to vary the condition of said first-named device and means for deenergizing said last-named device immediately after it has produced a change in the condition of said first-named device whereby said last-named device does not exhibit a drifting characteristic.

2. Translating apparatus comprising an electric-discharge device having a control electrode and a plurality of principal electrodes said device being of the type that has an energized condition and a deenergized condition and is capable only of abrupt transition from one condition to the other as the potentials impressed between its electrodes are varied and that exhibits a drifting characteristic that is evidenced by a variation in the distribution of potential between its electrodes for which it changes its condition at different times when operated in an energized condition for an appreciable length of time, means for impressing potentials between the electrodes of said electric-discharge device that are of such magnitude as to maintain said device in one of said conditions regardless of said drifting characteristic, means for changing the condition of said device, said means including: a second electric-discharge device having a plurality of electrodes, said device being of the type that is capable of abrupt transition from one condition to the other, means for impressing potentials between the electrodes of said last-named electric-discharge device to maintain said device deenergized thereby to maintain said first-named device in one of its conditions and means for so coupling said last-named electric discharge device to said first-named electric discharge device that when said last-named device is energized the change in potential produced between the electrodes of said first-named device is sufficient to change the condition of said first-named device regardless of said drifting characteristic; means for varying the potentials impressed between the electrodes of said last-named electric discharge device to energize said last-named device thereby to at all times immediately vary the condition of said first-named device and means for deenergizing said last-named device immediately after it has produced a change in the condition of said first-named device whereby said last-named device does not exhibit a drifting characteristic.

3. Apparatus according to claim 2 characterized by the fact that the deenergizing means for the last-named discharge device includes a capacitor to be discharged by the current transmitted by the last-named discharge device.

4. Apparatus according to claim 2 characterized by the fact that the deenergizing means for the last-named discharge device includes a capacitor to be discharged by the current transmitted by the last-named discharge device, and means for periodically discharging said capacitor to render said last-named discharge device periodically responsive to the means whereby it is energized.

THOMAS H. LONG.